: 
United States Patent [19]

Sekula et al.

[11] Patent Number: 6,039,998
[45] Date of Patent: Mar. 21, 2000

[54] FREEZABLE LOW-CALORIE SPOONABLE DRESSING AND METHOD FOR THEIR PRODUCTION

[75] Inventors: Bernard Charles Sekula, Lebanon Township, N.J.; Rosemary Antoinette Golden, New York City, N.Y.

[73] Assignee: Bestfoods, Englewood Cliffs, N.J.

[21] Appl. No.: 09/262,221

[22] Filed: Mar. 4, 1999

[51] Int. Cl.⁷ .................................................. A23D 9/007
[52] U.S. Cl. ........................................ 426/605; 426/611
[58] Field of Search ..................................... 426/611, 605

[56] References Cited

U.S. PATENT DOCUMENTS

| | | | |
|---|---|---|---|
| 3,490,918 | 1/1970 | Egan et al. | 99/118 |
| 4,208,444 | 6/1980 | Gilmore et al. | 426/570 |
| 4,582,715 | 4/1986 | Volpenhein | 426/601 |
| 4,797,300 | 1/1989 | Jandacek et al. | 426/549 |
| 4,840,815 | 6/1989 | Meyer et al. | 426/611 |
| 4,861,613 | 8/1989 | White et al. | 426/611 |
| 4,923,707 | 5/1990 | Schoenberg | 426/602 |
| 4,927,658 | 5/1990 | Klemann et al. | 426/611 |
| 4,983,329 | 1/1991 | Cooper | 426/611 |
| 4,983,413 | 1/1991 | Meyer et al. | 426/589 |
| 5,006,351 | 4/1991 | Klemann et al. | 426/611 |
| 5,008,126 | 4/1991 | Klemann et al. | 426/611 |
| 5,059,443 | 10/1991 | Ennis et al. | 426/531 |
| 5,063,075 | 11/1991 | Yarger et al. | 426/601 |
| 5,064,678 | 11/1991 | Klemann et al. | 426/611 |
| 5,093,142 | 3/1992 | Klemann et al. | 426/531 |
| 5,118,448 | 6/1992 | Cooper | 554/168 |
| 5,139,807 | 8/1992 | Klemann et al. | 426/531 |
| 5,190,782 | 3/1993 | Yarger et al. | 426/531 |
| 5,190,783 | 3/1993 | Klemann et al. | 426/531 |
| 5,230,913 | 7/1993 | Klemann | 426/97 |
| 5,266,346 | 11/1993 | Klemann et al. | 426/611 |
| 5,308,634 | 5/1994 | Cooper | 426/531 |
| 5,374,446 | 12/1994 | Ferenz et al. | 426/611 |
| 5,376,398 | 12/1994 | Cooper et al. | 426/611 |
| 5,387,429 | 2/1995 | Cooper | 426/611 |
| 5,389,392 | 2/1995 | Cooper | 426/531 |
| 5,399,371 | 3/1995 | Harris | 426/611 |
| 5,399,729 | 3/1995 | Cooper et al. | 554/149 |
| 5,427,815 | 6/1995 | Ferenz | 426/611 |
| 5,431,949 | 7/1995 | Meyer et al. | 426/611 |
| 5,512,313 | 4/1996 | Cooper | 426/611 |
| 5,516,544 | 5/1996 | Sekula | 426/611 |
| 5,589,217 | 12/1996 | Mazurek | 426/611 |
| 5,597,605 | 1/1997 | Mazurek | 426/611 |
| 5,645,881 | 7/1997 | Tancibok et al. | 426/531 |
| 5,858,439 | 1/1999 | Sekula | 426/531 |

FOREIGN PATENT DOCUMENTS

| | | |
|---|---|---|
| 0 236 288 | 9/1987 | European Pat. Off. |
| 0 415 635 A1 | 3/1991 | European Pat. Off. |
| 0571219 | 5/1993 | European Pat. Off. |
| 0 571 218 A2 | 11/1993 | European Pat. Off. |
| 0 571 219 A2 | 11/1993 | European Pat. Off. |
| WO 93/17584 | 9/1993 | France |
| WO 95/00034 | 1/1995 | WIPO |
| WO 97/22260 | 6/1997 | WIPO |

OTHER PUBLICATIONS

21 CFR Part 169, pp. 406–409 1982.
Swern 1979 Baileys Industrial Oil and Fat Products vol. 1, 4th Edition John Wiley & Sons New York p429–431.
Roller 1996 Handbook of Fat Replacers CRC Press New York p63, 108, 152, 271.
Charley 1970 Food Science The Ronald Press Co New York p254–256.

*Primary Examiner*—Carolyn Paden
*Attorney, Agent, or Firm*—Norris, McLaughlin & Marcus

[57] ABSTRACT

A reduced calorie spoonable dressing that exhibits freeze-thaw stability is disclosed. This dressing is made by replacing some or all of the blending salad oil with a fatty acid-esterified propoxylated glycerin composition having from about 3 to about 16 oxypropylene units per unit of glycerin.

17 Claims, No Drawings

FREEZABLE LOW-CALORIE SPOONABLE DRESSING AND METHOD FOR THEIR PRODUCTION

BACKGROUND OF THE INVENTION

1. Field of the Invention

The present invention concerns reduced calorie spoonable dressings that exhibit freeze-thaw stability. More specifically, the invention relates to spoonable dressings wherein some or all of the blended salad oil has been replaced with a fatty acid-esterified propoxylated glycerin composition having from about 3 to about 16 oxypropylene units per unit of glycerin. Replacement of the blended salad oil with these fatty acid-esterified propoxylated glycerin compositions provides the spoonable dressing with exemplary freeze-thaw stability.

2. Description of the Related Art

Conventional spoonable dressings, such as full fat mayonnaise, lack freeze-thaw stability. Dressings made with blended salad oil, such as soybean oils or other lipid based fats, will incur complete emulsion break after being frozen. The freeze-thaw characteristics of such dressings, like mayonnaises, are undesirable, for example, when storage and transportation occurs in climatic conditions wherein temperatures are below freezing. The lack of freeze-thaw stability of conventional dressings limits transportation and storage options available for full fat spoonable dressings. Conventional dressings, if frozen after a period of time, will separate when thawed thus rendering the dressing un-marketable.

It has now been found that certain fatty acid-esterified propoxylated glycerin compositions can be employed as a substitute for some or all of the blended salad oil in spoonable dressings such as mayonnaise. The compositions have a bland flavor and the ability to form a stable emulsion. The use of fatty acid-esterified propoxylated glycerin compositions as a partial replacement for all or some of the fat surprisingly provides the dressing with freeze-thaw stability. The freeze-thaw stability of the dressings improves as increased amounts of blended salad oil is replaced with the fatty acid-esterified propoxylated glycerin compositions. The dressing comprising the fatty acid-esterified propoxylated glycerin compositions as full or partial replacement for blended salad oil has reduced calories compared to full fat dressings. Thus, fatty acid-esterified propoxylated glycerin compositions can be used to make fine tasting, premium quality spoonable dressings having smooth texture, good spreadability and reduced calories with freeze-thaw stability.

Since fats make up approximately forty percent of the diet and provide about twice the amount of calories per gram compared to proteins or carbohydrates, research efforts have focused on ways to produce low fat and no fat foods that provide the same functional and organoleptic properties as their full fat counterparts, but not the calories. These efforts have led to the development and utilization of carbohydrate and protein based fat extenders for non-heated applications (e.g. mayonnaise) and the development of lipid based fat replacers for both non-heated and heated applications. Drawbacks to the utilization of carbohydrate and protein based fat extenders, however, include potential flavor and taste problems, substandard texture and lack of "fatty" mouthfeel.

Fat replacement compositions which have been developed for use in low calorie fat containing foods are known. An early development employing sugar fatty acid esters is described in U.S. Pat. No. 3,600,186.

Low fat and no fat mayonnaise prepared with lipid based fat replacers are described in the art, and examples include acylated glycerides (U.S. Pat. No. 4,582,715), sucrose octaesters (U.S. Pat. No. 4,797,300), alkyl glycoside fatty acid polyesters (U.S. Pat. No. 4,840,815), polysiloxane oil (U.S. Pat. No. 4,983,413), cyclohexyl diol diesters (U.S. No. Pat. No. 5,006,351), long chain diol diesters (U.S. Pat. No. 5,008,126), amide ether derivatives (U.S. Pat. No. 5,063,075), complex linked esters (U.S. Pat. No. 5,064,678), alcohol amine esters (U.S. Pat. No. 5,093,142), amide linked fat mimetics (U.S. Pat. No. 5,139,807), acylated amino acid ester derivatives (U.S. Pat. No. 5,190,782), primary amide esters (U.S. Pat. No. 5,190,783) and fat mimetics having mineral core with fatty coating (U.S. Pat. No. 5,230,913). However, no mention has been made that the substitution of vegetable oil with these fat replacers in mayonnaise improves product quality or stability, including providing the mayonnaise with freeze-thaw stability. All of the low calorie fat replacement compositions discussed above have drawbacks either in the processes which employ them, or the flavor and mouthfeel characteristics of the finished reduced fat products.

Reduced calorie food compositions containing fat-type organoleptic ingredients are known wherein an esterified epoxide-extended polyol is employed as a full or partial replacement for vegetable oils and fats. Fat substitutes of this type are disclosed in U.S. Pat. No. 4,861,613 to White et al. (referred to herein as "White" and incorporated by reference herein in its entirety).

Applications of the assignee of the invention involving the replacement of conventional fat in comestible products with fatty acid-esterified propoxylated glycerin compositions are currently pending. These Applications involve the use of fatty-acid esterified propoxylated glycerin compositions in milk products, Reduced Calorie Reconstituted Milk and Milk Products, Ser. No. 08/572,277 filed on Dec. 13, 1995 and fried snack foods, Reduced Calorie Fried Snacks, Ser. No. 08/575,711 and Reduced Calorie Fried Snacks Having a Cooling Sensation When Placed in the Mouth, Ser. No. 08/575,373 both filed on Dec. 20, 1995. These applications do not involve dressing preparations or the effect of fatty acid-esterified propoxylated glycerin compositions on freeze-thaw characteristics.

In the present specification and claims, all parts and percentages are by weight unless otherwise specified.

SUMMARY OF THE INVENTION

The fatty acid-esterified propoxylated glycerin compositions (sometimes referred to herein as "EPG" in the singular form and as "EPGs" in the plural form) are made by incorporating propylene oxide (sometimes referred to herein as "oxypropylene" or "PO") groups into a typical triglyceride fat as described in White. The average number of PO groups which are incorporated into a triglyceride is called the propoxylation number. The melting profile and other characteristics of the composition can be modified by adjusting the propoxylation number of a triglyceride, combining (i.e., employing as ingredients in a recipe) two or more different EPGs (i.e., having different propoxylation numbers) with the same fatty acid composition, combining two or more EPGs having different fatty acid compositions and having the same or different propoxylation numbers, and any combination thereof which provides the desired melting profile characteristics.

The invention exhibits freeze-thaw stability, that is the emulsion does not experience complete emulsion break upon thawing after a period of being continuously frozen, superior to that of conventional spoonable dressings made with blended salad oil. Spoonable dressings prepared with EPGs demonstrated only slight oil separation upon thawing after being frozen for about 24 days. In comparison, however, conventional mayonnaise formulations prepared with blended salad oil, such as soybean oil, exhibited complete emulsion break after being frozen for about 4 days.

In addition to freeze-thaw stability, the invention provides a reduced calorie spoonable dressing which employs EPG as a replacement for all or some of blended salad oil in the mayonnaise. The dressing comprising EPG has similar organoleptic characteristics as full fat dressing. The organoleptic qualities of the invention are significantly better than can be achieved with carbohydrate-based fat extenders or replacers.

EPG compositions with propoxylation numbers from about 3 to about 16 are used as full or partial replacement of conventional oil in a dressing preparation. An embodiment of the spoonable dressing composition of the invention employs as fat replacement ingredients in a dressing recipe a fully hydrogenated soybean fatty acid-esterified propoxylated glycerin composition having a propoxylation number of about 5, that is about 5 oxypropylene units per unit of glycerin, (referred to herein as "FHEPG-05 soyate") or a fully hydrogenated soybean fatty acid-esterified propoxylated glycerin composition having a propoxylation number of about 14, that is about 14 oxypropylene units per unit of glycerin, (referred to herein as "FHEPG-14 soyate") or a combination thereof.

DETAILED DESCRIPTION OF THE INVENTION

In order for the fatty acid compositions of the invention to function effectively as reduced calorie substitutes for blended salad oils which are suitable for use in spoonable dressings, it is essential that the organoleptic qualities of the EPG mimic as closely as possible the organoleptic qualities of the replaced fat. For spoonable dressings, it is essential that the EPG have organoleptic properties similar to the organoleptic properties of the blended salad oil that is replaced by the EPG. The EPG must additionally have physical properties (e.g. viscosity, melting point, heat stability, thermal conductivity, etc.) similar to the blended salad oil.

Blended salad oils used in preparation of conventional spoonable dressings are generally lipid based vegetable oils, such as soybean oil, although other types and combination of oils can be used. The blended salad oil is combined with other ingredients to form an emulsion. When a conventional dressing is frozen and allowed to thaw, the blended salad oil breaks from the emulsion resulting in product separation. As will be explained in more detail below, it has now been unexpectedly found that when the propoxylation number and fatty acid chain length and unsaturation level are carefully controlled such that the propoxylation numbers of the EPG is from about 3 to about 16, the dressing will have freeze-thaw stability, and such stability significantly superior compared to conventional mayonnaise.

Substitution of such EPG compositions for the blended salad oil also unexpectedly results in a spoonable dressing with superior flavor, taste, texture and superior taste compared to dressings prepared with the carbohydrate based replacements known in the art. The spoonable dressings comprising the EPG unexpectedly possess the same organoleptic character of full-fat products.

The dressings made with EPG have freeze-thaw stability, meaning that the emulsion does not experience complete break upon thawing after being frozen for a continuous period of time. Replacement of larger amounts of blended salad oil with EPG, results in better freeze-thaw characteristics. For example, replacement of about 40 weight percent of the blended salad oil with EPG results in a dressing with freeze-thaw stability, with only small free water droplets observed when the dressing is frozen for about 96 hours with complete emulsion break occurring only after about 504 hours of freezing. When the amount of blended salad oil replaced by EPG is increased to 80 weight percent, no effect on the dressing is observed when the dressing is frozen for about 504 hours. Freeze-thaw stability is generally experienced when about 25 weight percent or more of the conventional blended salad oil is replaced with the EPG, particularly EPG with propoxylation numbers from about 3 to about 16.

The reason for freeze-thaw stability when all or some of the conventional blended salad oil is replaced with EPG compositions with propoxylation numbers from about 3 to about 16 is not completely understood and the inventors wish not to be bound by any particular theory. The properties of EPG that arise from the particular formulations whereby the propoxylation numbers range from about 3 to about 16 may effect the freeze-thaw stability. EPGs with propoxylation numbers less than about 3 act more like conventional vegetable oil and loose emulsifying properties. EPG compositions with propoxylation numbers greater than about 16 become too soft for use and creation of stable dressings. EPG compositions with from about 3 to about 16 oxypropylene units per unit of glycerin have sufficient polarity and hydrophilicity to assist with better interaction with water making the number of oxypropylene groups critical to water interaction and emulsion stability, particularly freeze-thaw stability. Thus, the unique physical properties of EPG compositions with propoxylation numbers from about 3 to about 16 results in a more stable dressing thus providing the freeze-thaw stability. Another theory, particularly pertinent where the EPG is used as a partial fat replacement, is that the oxypropylene groups effect the ability of the fat to crystallize in typical fashion thus resulting in better thermal stability, e.g. freeze-thaw stability.

The EPG compositions of this invention contain glyceryl residues, oxypropylene units, and fatty acid acyl

groups. Typically, the compositions are mixtures of individual EPG compositions which may differ from each other in degree of propoxylation and acyl group composition. The glyceryl residue may have the generic structure

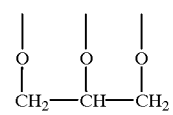

and is derived from glycerin

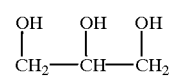

or a glycerin equivalent. The oxypropylene units are generally interspersed between glyceryl residues and the acyl groups and have the structure

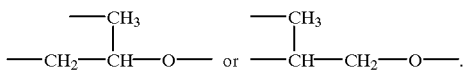

Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units, although an average of at least about 3 oxypropylene units per glyceryl residue must be present in the overall composition. The average number of oxypropylene units per unit of glycerin in the EPG composition useful for making the reduced calorie dressings with freeze-thaw stability is from about 3 to about 16 and can be from about 5 to about 14. The presence of oxypropylene units is critical, as the oxypropylene units help to lower the melting point of the compositions thereby improving the mouthfeel and melting characteristics as compared to analogous compositions not containing oxypropylene units. EPG compositions with propoxylation numbers from about 3 to about 16 are suitable for the invention as this results in a solid fat index appropriate for providing the dressings with the mouthfeel and organoleptic properties of conventional dressings made with blended salad oil and provides for a dressing with freeze-thaw stability.

In order to maximize the resistance of the composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

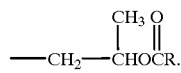

Preferably, at least about 80 percent of the ester linkages in the overall composition are secondary. Most preferably, at least about 95 percent of the ester linkages are secondary. However, the secondary ester content can be less than about 80 percent without adversely affecting the organoleptic properties of the invention.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than about 10 percent, and preferably less than about 1 percent, as compared to an olive oil standard. Methods of measuring porcine pancreatic lipase hydrolysis rate are described in White.

The average number of oxypropylene units in the EPG must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute.

Suitable EPGs may be prepared using either fatty acids or fatty acid derivatives such as fatty acid esters, fatty acid halides, or fatty acid anhydrides. Generally speaking, $C_{12}$–$C_{24}$ saturated linear fatty acids and their derivatives are preferred for use as starting materials for preparing the EPGs. Minor amounts of unsaturated and/or branched and/or shorter chain fatty acids may also be utilized as explained in more detail below.

In addition, the iodine number (which reflects the proportion of unsaturated fatty acid acyl groups in the composition) must be less than about 30, more preferably is less than about 20, and most preferably is less than about 10 centigrams 12 per gram of the composition. A relatively minor proportion of unsaturated fatty acid acyl groups may be advantageous, however, in order to ensure that the composition does not melt over an excessively narrow range. Iodine number (also referred to as iodine value) may be measured by AOCS Method Cd 1-25.

The $C_{12}$–$C_{24}$ saturated fatty acid is linear (i.e., nonbranched) and preferably contains only one carboxylic acid functionality. The acyl group may thus correspond to the general structure

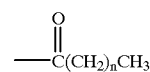

wherein n is an integer of from 10 to 22. The value of n is most conveniently an even number (e.g., 10, 12, 14, 16, 18, 20, or 22) since the corresponding fatty acids are readily available at low cost from natural sources such as edible triglycerides. Specific illustrative fatty acids suitable for use as this component of the EPG compositions include, but are not limited to lauric acid, myristic acid, stearic acid, palmitic acid, eicosanoic (arachidic) acid, heneicosanoic acid, docosanoic (behenic) acid, tricosanoic acid, and tetracosanoic (lignoceric) acid. Mixtures of these $C_{12}$–$C_{24}$, saturated linear fatty acids may also be utilized to advantage, as discussed above.

While all of the acyl groups in the EPG composition may be derived from $C_{12}$–$C_{24}$ saturated linear fatty acid, the compositions may contain minor amounts of acyl groups derived from other $C_8$–$C_{18}$, fatty acids. Preferably, the proportion of such other acyl groups is less than about 40 percent. Generally speaking, the incorporation of acyl groups which are relatively short in length ($C_8$–$C_{18}$), unsaturated, and/or branched will tend to decrease the melting point of the resulting EPG.

The fatty acids which optionally may be used in combination with the $C_{12}$–$C_{24}$, saturated linear fatty acids may be any of the known fatty acids such as caprylic acid, pelargonic acid, capric acid, oleic acid, cetoleic acid, palmitoleic acid, gadoleic acid, erucic acid, ricinoleic acid, linoleic acid, myristoleic acid, eleostearic acid, arachidonic acid, or mixtures of these acids. Preferably, linear monocarboxylic acids containing from 0 to 5 double bonds are employed.

The average number of fatty acid acyl group carbons per equivalent of glycerin in the fatty acid-esterified propoxylated glycerin compositions of the invention may be readily calculated from a knowledge of the fatty acid acyl group content (i.e., the chemical structures and relative proportions of the fatty acids used to prepare the compositions). The following formula may be used to calculate this average number ($N_a$) for an EPG composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the EPG compositions of this invention, which are employed as full or partial replacement of blended salad oil in dressing preparations, the chemical composition should be selected such that the number average molecular weight is at least about 800. More preferably, the minimum molecular weight is about 1,000; in order for the fatty acid-esterified propoxylated glycerin composition to mimic as closely as possible the physical properties of blended salad oil (such as texture, melting point, viscosity, heat stability and thermal conductivity). It is also desirable that the number average molecular weight not exceed about 2,200. Preferably, the molecular weight is below about 2,000.

Stearic (i.e. $C_{18}$) fatty acid compositions may be employed to obtain the EPG compositions suitable for use in the reduced calorie spoonable dressings which exhibit freeze-thaw stability. For example, fatty acids which are predominantly stearic, have at least about 75 percent and preferably at least about 80 percent by weight of saturated $C_{18}$ fatty acid. Hydrogenated soybean fatty acid is predominantly stearic, generally from about 83 percent to about 93 percent by weight, and it has been found to be particularly suitable for preparing the blended salad oil substitutes. Other fatty acid sources having more than about 75 percent stearic acid after hydrogenation include corn oil, cottonseed oil, olive oil, peanut oil, canola (low erucic rapeseed) oil, safflower oil, sesame oil, sunflower oil and mixtures thereof.

EPG compositions with propoxylation numbers from about 3 to about 16, including propoxylation numbers from about 5 to about 14, are useful as full or partial replacements for lipid based fats in spoonable dressings to obtain spoonable dressings with freeze-thaw stability and reduced calories. EPG compositions having an average number of oxypropylene units per equivalent of glycerin (propoxylation number) of about 5 wherein at least about 80 percent by weight of the fatty acid is stearic acid, or having a propoxylation number of about 14 wherein at least about 80 percent by weight of the fatty acid is stearic acid; an iodine number less than about 10; an average number of fatty acid acyl group carbons per equivalent of glycerin of from about 48 to about 56, and combinations thereof are particularly useful as replacement compositions for the blended salad oil in spoonable dressings such as mayonnaise to make reduced calorie spoonable dressings with freeze-thaw stability.

The fatty acid-esterified propoxylated glycerin blended salad oil replacement compositions of this invention may be prepared using any suitable method. In general, the procedures described in the prior art for synthesizing other fatty acid-esterified propoxylated glycerin compositions will be appropriate for use provided that the necessary $C_{12}$–$C_{24}$ saturated linear fatty acids (or precursors thereof) or fatty acid derivatives are employed in the esterification step. Such procedures are described, for example, in U.S. Pat. No. 4,861,613 (the White patent, referenced above) and U.S. Pat. No. 4,983,329, and in European Patent Publication No. 353,928, the disclosures of which are incorporated by reference herein in their entirety. Either fatty acids or fatty acid equivalents such as fatty acid esters, fatty acid halides, or fatty acid anhydrides may actually be employed in the esterification. The $C_{12}$–$C_{24}$ saturated linear fatty acid acyl groups may also be introduced by using $C_{12}$–$C_{24}$ unsaturated fatty acids in the esterification step and then hydrogenating the fatty acid-esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off flavor, off-odor, or storage stability.

The spoonable dressings are prepared with EPG as a full or partial replacement of conventional fat in the dressing. Freeze-thaw stability is experienced when about 25 percent or more of the blended salad oil is replaced with EPG, that is the fat component has a composition of from about 25 weight percent to 100 weight percent EPG with the balance (zero to about 75 weight percent) blended salad oil. Excellent freeze-thaw stability is experienced when about 40 percent or more of the conventional fat of the mayonnaise is replaced with EPG (e.g. between about 40 weight percent and 100 weight percent of the blended salad oil is replaced with EPG), particularly the EPG compositions described above. In this embodiment the fat component has a composition of from about 40 weight percent to 100 weight percent EPG with the balance (zero to about 60 weight percent) blended salad oil. Exemplary freeze-thaw stability is experienced when between about 80 percent and 100 percent of the conventional fat is replaced with EPG. In this embodiment the fat component has a composition of from about 80 weight percent to 100 weight percent EPG with the balance (zero to about 20 weight percent) blended salad oil. When less than about 25 percent of the conventional fat is replaced with EPG, the freeze-thaw characteristics of the dressing is similar to the full fat compositions.

In addition to the fat component comprised of the EPG, the spoonable dressings may further comprise other ingredients such as seasonings, spices and flavorings. The spoonable dressings may also include emulsifiers such as lecithin, antioxidants, dietary fibers, vitamins, bulking or bodying agents such as polydextrose or modified starch, salt and the like. A sugar alcohol such as sorbitol, xylitol, or mannitol or a reduced calorie sweetener such as saccharine, aspartame, cyclamates, sucralose, acesulfame, acesulfam-K, or the like may also be employed in combination with the EPG composition. The spoonable dressing compositions are prepared by traditional methods for making mayonnaise as would be apparent to one skilled in the art.

The EPGs utilized in the examples were synthesized from soybean fatty acid and propoxylated glycerin (prepared by reacting 5 or 14 equivalents of propylene oxide per equivalent of glycerin under base-catalyzed conditions) and physically refined. The resulting materials were hydrogenated to saturation (IV<4), bleached and deodorized. The deodorized products were fortified with a mixed tocopherol blend of 50% Covi-ox T70 and 50% Covitol F1300 (both available from Henkel Corp., La Grange, Ill., U.S.A.) to a level of 0.16%. The finished products were characterized using analytical methods commonly used by the industry to evaluate oils and fats. These methods include Wijs iodine value (AOCS Cd 1-25) and dropping point (AOCS Cc 18-80 (93)).

EXAMPLES 1–4

Spoonable dressings were prepared by blending the components in a Hobart Mixer from Hobart Corporation, Troy, Ohio, U.S.A. and milling the blend in a Charlotte Colloid Mill from Chemicolloid Laboratories, Inc., Garden City Park, N.Y., U.S.A. Conventional blending and milling techniques familiar to one skilled in the art were used to prepare the mayonnaise and spoonable dressings in these Examples.

The content of the mayonnaise and spoonable dressings blended and milled for these examples and product analyses are set forth in Table 1. Product analyses were conducted by methods known in the art. Two samples (Examples 1 and 4) were prepared using 77.3 parts by weight blended salad oil, one sample (Example 2) was prepared with 77.3 parts by weight FHEPG-05 soyate and one sample (Example 3) was prepared using 77.3 parts by weight FHEPG-14 soyate. Thus, in Examples 2 and 3 all of the blended salad oil is replaced with EPG, and Examples 1 and 4 are full fat spoonable dressing preparations, i.e. mayonnaise.

The iodine value for the FHEPG-05 soyate employed in the Example 2 was 2.2, and for the FHEPG-14 soyate in Example 3 the iodine value was 1.7. The dropping point for the FHEPG-05 soyate in Example 2 was measured at 79.9, and for FHEPG-14 soyate in Example 3 the dropping point was measured at 63.7.

TABLE 1

MAYONNAISE FORMULATION AND ANALYSIS

| | EXAMPLES | | | |
|---|---|---|---|---|
| | 1 | 2 | 3 | 4 |
| Formula (Parts by Weight) | | | | |
| Water | 8.5 | 8.5 | 8.5 | 8.5 |
| Vinegar (120 grain) | 2.4 | 2.4 | 2.4 | 2.4 |
| Egg Spice Mix | 11.8 | 11.8 | 11.8 | 11.8 |
| Blended Salad Oil | 77.3 | | | 77.3 |
| FHEPG-05 Soyate | | 77.3 | | |
| FHEPG-14 Soyate | | | 77.3 | |
| Product Analysis | | | | |
| Acid (%) | .28 | .29 | .28 | .29 |
| Salt (%) | 1.5 | 1.5 | 1.5 | 1.5 |
| pH | 3.9 | 4.1 | 4.0 | 4.0 |
| Particle Size Vol. Mean Diameter ($\mu$m) | 5.9 | 5.0 | 7.6 | 4.8 |

Examples 1–4 were subjected to a freeze-thaw test at 15° F. for 45 days. A Forma model 3710, 18.8 ft$^3$ freezer was set at 15° F.±2° F. with the defrost cycle control on 40° F. The freezer was equipped with a 7 day 10" chart recorder. Thermometers used for the study had effective ranges from −30° F. to 125° F. and were calibrated in 1° F. increments. The thermometers remained in the freezer at all times during the freeze-thaw test.

Jars of each sample were allowed to equilibrate at least 24 hours at room temperature before being placed into the freezer. Duplicate jars of each sample were prepared and labeled for each time period of 2, 6, 7, 8, 10, 12, 14, 17, 24, 36 and 45 days. The duplicate jars were all placed in the freezer in a manner to avoid direct contact with the shelves, walls and bottom of the freezer.

At the end of two days in the freezer, 2 jars of each sample were removed and allowed to equilibrate at room temperature with a minimum overnight equilibration time. The thawed samples were observed for emulsion break and observations were recorded based on a sliding scale of 0 to 3 as set forth in the key for Table 2. Observations were recorded for (0) no separation, (1) slight oil separation, (2) moderate/significant oil separation and (3) complete emulsion break. The procedure was repeated at days 6, 7, 8, 10, 12, 14, 17, 24, 36 and 45.

Example 4 formulated with blended salad oil exhibited complete emulsion break after being continuously frozen for about 6 days. Example 1 formulated with blended salad oil exhibited moderate to significant oil separation after being continuously frozen for about 6 days and complete emulsion break after being continuously frozen for about 7 days. Examples 2 and 3 made with FHEPG-5 soyate and FHEPG-14 soyate, respectively, exhibited no separation after being continuously frozen for about 17 days and exhibited only slight oil separation after being frozen continuously for about 24, 36 and 45 days.

TABLE 2

FREEZE-THAW STABILITY STUDY DATA

| Day | 1 | 2 | 3 | 4 |
|---|---|---|---|---|
| | Score | | | |
| 2 | 0 | 0 | 0 | 0 |
| 6 | 2 | 0 | 0 | 3 |
| 7 | 3 | 0 | 0 | 3 |
| 8 | 3 | 0 | 0 | 3 |
| 10 | 3 | 0 | 0 | 3 |
| 12 | 3 | 0 | 0 | 3 |
| 14 | 3 | 0 | 0 | 3 |
| 17 | 3 | 0 | 0 | 3 |
| 24 | 3 | 1 | 1 | 3 |
| 36 | 3 | 1 | 1 | 3 |
| 45 | 3 | 1 | 1 | 3 |

Key:
0 = No Separation
1 = Slight Oil Separation
2 = Moderate/Significant Oil Separation
3 = Complete Emulsion Break

EXAMPLES 5–9

Samples of mayonnaise using the equipment and techniques employed for making the samples for Examples 1–4 were prepared based on the following formulation: 8.5 parts by weight water, 2.4 parts by weight vinegar (120 grain), 11.8 parts by weight egg spice mix and 77.3 parts by weight fat component (i.e. blended salad oil or blended salad oil/EPG). The EPG used for preparing Examples 6 through 9 was FHEPG-05 soyate, that is an EPG synthesized from soybean fatty acid and propoxylated glycerin with 5 equivalents of propylene oxide per equivalent of glycerin. The content of the fat component is set forth in Table 3.

TABLE 3

FAT COMPONENT CONTENT

| EXAMPLE NO. | WEIGHT PERCENT BLENDED SOYBEAN OIL | WEIGHT PERCENT EPG |
|---|---|---|
| 5 | 100 | 0 |
| 6 | 99 | 1 |
| 7 | 90 | 10 |
| 8 | 60 | 40 |
| 9 | 20 | 80 |

Duplicate jars of each dressing preparation (Examples 5-9) were prepared for each observation time of 1 hour, 10 hours, 96 hours (4 days), 240 hours (10 days) and 504 hours (21 days). The samples were subjected to a freeze-thaw test using the same equipment and procedure as for Examples 114 4. The observations for these examples were recorded based on the following sliding scale:

0—No detectable separation of any kind.
1—Small free oil or water droplets on the surface of the product usually found around the edges.
2—Free oil clearly visible. (Usually in a pocket on top of the product.)
3—Mottled product with oil streaks throughout.
4—Complete break with clear water meniscus.

The observations made for Examples 5–9 after 1, 10, 96, 240 and 504 hours of freeze/thaw cycle are reported in Table 4.

TABLE 4

| EXAMPLE | HOURS | | | | |
|---|---|---|---|---|---|
| | 1 | 10 | 96 | 240 | 504 |
| 5 (0% EPG) | 0.0 | 0.0 | 4.0 | 4.0 | 4.0 |
| 6 (1% EPG) | 0.0 | 0.0 | 4.0 | 4.0 | 4.0 |
| 7 (10% EPG) | 0.0 | 0.0 | 4.0 | 4.0 | 4.0 |
| 8 (40% EPG) | 0.0 | 0.0 | 1.0 | 2.5 | 4.0 |
| 9 (80% EPG) | 0.0 | 0.0 | 0.0 | 0.0 | 0.0 |

Spoonable dressing preparations comprising EPG exhibit freeze-thaw characteristics significantly different than conventional spoonable dressings. Freeze-thaw stability occurs when about 25 weight percent or more of the blended salad oil in the fat component of the dressing is replaced with EPG. The freeze-thaw characteristics are further improved when at least about 40 percent of the blended salad oil is replaced, and when at least about 80 percent of the blended salad oil is replaced with EPG, no emulsion break is observed after 21 days. The spoonable dressing compositions exhibit freeze-thaw stability and improved freeze-thaw stability compared to conventional mayonnaise, that is the dressing will not exhibit complete emulsion break upon thawing after being continuously frozen, when the fat component has equal to or more than about 25 weight percent EPG.

What is claimed is:

1. A spoonable dressing composition having a fat component comprising at least about 25 weight percent fatty acid-esterified propoxylated glycerin having an average of about 3 to about 16 oxypropylene units per unit of glycerin and the fatty acid of the fatty acid esterified propoxylated glycerine is at least about 75% by weight stearic acid with the balance of the fat component comprising blended salad oil which composition exhibits freeze-thaw stability.

2. The spoonable dressing composition of claim 1 wherein said fat component comprises from about 40 weight percent to 100 weight percent of said fatty acid-esterified propoxylated glycerin and from zero to about 60 weight percent blended salad oil.

3. The spoonable dressing composition of claim 1 wherein said fat component comprises from about 80 weight percent to 100 weight percent of said fatty acid-esterified propoxylated glycerin and from zero to about 20 weight percent blended salad oil.

4. The spoonable dressing composition of claim 1 wherein said fatty acid-esterified propoxylated glycerin has an average molecular weight from about 800 to about 2,200.

5. The spoonable dressing composition of claim 1 wherein the fatty acids in said fatty acid-esterified propoxylated glycerin are derived from an oil selected from the group consisting of soybean oil, corn oil, cottonseed oil, olive oil, peanut oil, canola oil, safflower oil, sesame oil, sunflower oil and mixtures thereof.

6. The spoonable dressing composition of claim 1 wherein said fatty acid-esterified propoxylated glycerin is selected from a group consisting of fatty acid-esterified propoxylated glycerin having an average number of about 5 oxypropylene units per unit of glycerin, fatty acid-esterified propoxylated glycerin having an average number of about 14 oxypropylene units per unit of glycerin or mixtures thereof.

7. The spoonable dressing composition of claim 6 wherein the fatty-acid in said fatty-acid esterified propoxylated glycerin comprises at least about 80 percent by weight stearic acid.

8. The spoonable dressing composition of claim 1 wherein said blended salad oil is soybean oil.

9. A method of making a spoonable dressing composition which exhibits freeze-thaw stability comprising blending a fat component of at least about 25 weight percent fatty acid-esterified propoxylated glycerin having an average of about 3 to about 16 oxypropylene units per unit of glycerin and the fatty acid of the fatty acid esterified propoxylated glycerin is at least about 75% by weight stearic acid with the balance of the fat component comprising blended salad oil, with other ingredients in a mixer and then milling the blend.

10. The method of claim 9 wherein said fat component comprises from about 40 weight percent to 100 weight percent of said fatty acid-esterified propoxylated glycerin and from zero to about 60 weight percent blended salad oil.

11. The method of claim 9 wherein said fat component comprises from about 80 weight percent to 100 percent of said fatty acid-esterified propoxylated glycerin and from zero to about 20 weight percent blended salad oil.

12. The method of claim 9 wherein said fatty acid-esterified propoxylated glycerin has an average molecular weight from about 800 to about 2,200.

13. The method of claim 9 wherein said other ingredients are selected from the group consisting of vinegar, egg spice, water, seasonings, spices and flavorings, or combinations thereof.

14. The method of claim 9 wherein the fatty acids in said fatty acid-esterified propoxylated glycerin are derived from an oil selected from the group consisting of soybean oil, corn oil, cottonseed oil, olive oil, peanut oil, canola oil, safflower oil, sesame oil, sunflower oil and mixtures thereof.

15. The method of claim 9 wherein said blended salad oil is soybean oil.

16. The method of claim 9 wherein said fatty acid-esterified propoxylated glycerin is selected from a group consisting of fatty acid-esterified propoxylated glycerin having an average number of about 5 oxypropylene units per unit of glycerin, fatty acid-esterified propoxylated glycerin having an average number of about 14 oxypropylene units per unit of glycerin or mixtures thereof.

17. The method of claim 16 wherein the fatty acid in said fatty acid-esterified propoxylated glycerin comprises at least about 80 percent by weight stearic acid.

* * * * *